US008392240B2

(12) United States Patent
Vaidhyanathan et al.

(10) Patent No.: US 8,392,240 B2
(45) Date of Patent: Mar. 5, 2013

(54) SYSTEM AND METHOD FOR DETERMINING OUTSOURCING SUITABILITY OF A BUSINESS PROCESS IN AN ENTERPRISE

(75) Inventors: Shyamsundar Vaidhyanathan, Gurgaon (IN); Lovekesh Dev, Haryana (IN); Debraj Shattacharyya, Haryana (IN)

(73) Assignee: Oracle Financial Services Software Limited, Mumbai (IN)

( * ) Notice: Subject to any disclaimer, the term of this patent is extended or adjusted under 35 U.S.C. 154(b) by 1571 days.

(21) Appl. No.: 11/469,491

(22) Filed: Sep. 1, 2006

(65) Prior Publication Data

US 2008/0059387 A1 Mar. 6, 2008

(51) Int. Cl.
*G06Q 10/00* (2012.01)

(52) U.S. Cl. ...................................... 705/7.36; 705/7.12

(58) Field of Classification Search ....................... 705/8
See application file for complete search history.

(56) References Cited

U.S. PATENT DOCUMENTS

| | | | | |
|---|---|---|---|---|
| 5,765,138 | A * | 6/1998 | Aycock et al. | 705/7 |
| 6,895,382 | B1 * | 5/2005 | Srinivasan et al. | 705/7.17 |
| 7,957,996 | B2 * | 6/2011 | Goldberg et al. | 705/7.12 |
| 2001/0051913 | A1 * | 12/2001 | Vashistha et al. | 705/37 |
| 2003/0033179 | A1 * | 2/2003 | Katz et al. | 705/7 |
| 2005/0216395 | A1 * | 9/2005 | Behmoiras et al. | 705/38 |
| 2006/0004596 | A1 * | 1/2006 | Caniglia et al. | 705/1 |
| 2007/0033060 | A1 * | 2/2007 | Gopalan et al. | 705/1 |
| 2007/0162321 | A1 * | 7/2007 | Behrmann et al. | 705/9 |
| 2008/0255900 | A1 * | 10/2008 | Lawrence et al. | 705/7 |

OTHER PUBLICATIONS

"Business risk perspectives on information systems outsourcing" S Bhattacharya, RS Behara, DE Gundersen—International Journal of . . . , 2003—Elsevier.*

"Outsourcing Strategies", 1998, Department of Information Services, Austin Texas, pp. 1-72.*

An empirical examination of the determinants of successful transition management in offshore business process outsourcing aisnet.org [PDF]J Ganesh, D Moitra—Proceedings of the 10th Americas Conference . . . , 2004—aisel.aisnet.or.*

Information technology enabled process outsourcing and reengineering: Case study of a Mortgage Bank aisnet.org [PDF]N Dayasindhu—Americas Conference on Information Systems ( . . . , 2004—aisel.aisnet.org.*

Business process outsourcing: impact and implications unescap.org [PDF]B Nag—Bulletin on Asia-Pacific Perspectives, 2004—unescap.org.*

IT Led Business Process Management in the Financial Services Industry: Moving Beyond the Steady State infosys.com [PDF]N Dayasindhu—2004—infosys.com.*

A knowledge-based risk assessment framework for evaluating web-enabled application outsourcing projects WL Currie—International Journal of Project Management, 2003—Elsevier.*

Using the Build-Operate-Transfer Model (BOT) to Outsource Life Science R&D to India acunovalife.com [PDF]N Prasanna—acunovalife.com 2005.*

* cited by examiner

*Primary Examiner* — Jonathan G Sterrett
(74) *Attorney, Agent, or Firm* — Narendra Reddy Thappeta

(57) ABSTRACT

A system and method for determining outsourcing suitability of at least one business process in an enterprise. The method comprising screening at least one business process in the enterprise to obtain a first set of business processes, wherein the first set of business processes can potentially be outsourced. The method further comprising evaluating each potential-business-process corresponding to the first set of business process on a predefined criterion to obtain a second set of business process, wherein the second set of business processes can be outsourced. Also, a migration plan is prepared corresponding to potential-business-processes corresponding to the second set of business processes.

10 Claims, 4 Drawing Sheets

SYSTEM AND METHOD FOR DETERMINING OUTSOURCING SUITABILITY OF A BUSINESS PROCESS IN AN ENTERPRISE

RELATED APPLICATIONS

Benefit is claimed under 35 U.S.C. 119(a)-(d) to Foreign application Ser. 501/MUM/2006 entitled "A METHOD AND SYSTEM FOR DETERMINING OUTSOURCING SUITABILITY OF A BUISNESS PROCESS IN AN ENTERPRISE" by, Vaidhyanathan Shyamsundar filed on Mar. 31st 2006, which is herein incorporated in its entirety by reference for all purposes.

FIELD OF THE INVENTION

The present invention generally relates to outsourcing of business processes. More specifically, the present invention relates to determining outsourcing suitability of a business process in an enterprise.

BACKGROUND OF THE INVENTION

Business Process Outsourcing (BPO) is generally refers to the delegation of certain operations of an enterprise to service providers having expertise and specialization in dealing with these operations. There are several factors in outsourcing certain operations for an enterprise. The primary factors for outsourcing can be for example, controlling and reducing operating cost, redirecting resources from one operation to a more critical operation, non availability of resources internally to handle certain operations and a need to focus on the more critical operations.

There exist several methods for analyzing suitability of a business process for outsourcing. The methods analyze the outsourcing of the business process with respect to the cost reduction potential.

An existing outsourcing decision making tool, "Identeon Opportunity & Site analysis Tool", disclosed by Syntel, Inc. measures business processes on two factors through a predetermined set of parameters. The factors are opportunity analysis and site analysis. The opportunity analysis helps in identifying the business processes that can be outsourced. The site analysis helps in identifying an appropriate location for the business process. The business processes are studied in detailed using the approach.

Another existing solution, "the pH Matrix", disclosed by iGate Global solutions, identifies outsourcing suitability of business processes in an enterprise through a detailed evaluation of these business processes along with an estimate of the financial benefits likely to accrue by outsourcing these processes.

In addition, there exist several strategic framework techniques for identifying outsourcing suitability of business processes. One such technique, "The Yang-Huang model (Yang, C. & Huang, J. 2000)" is a framework which utilizes the Analytic Hierarchy Process (AHP) method to aid users in structuring problems related to outsourcing decision making. The AHP method works on the principle that a complex problem can be dealt with by decomposing it into sub-problems within a hierarchy.

Another strategic technique, "The McIvor Framework (McIvor, R. 2000)", addresses the outsourcing decision making process by integrating established key theories associated with outsourcing such as core competency thinking, value chain perspectives and supply base influences. It is comprised of four stages, namely definition of the core activities of the business, evaluation of the value chain activities, total cost analysis of the core activities and relationship analysis.

However, each of these prior art suffers from one or more of the following limitations. A majority of outsourcing process selection decisions are taken on cost reduction potential alone, without a detailed understanding of the business process, of the service provider's competence vis-à-vis business process requirements and without quantification of the possible financial benefit. Further, each business process is evaluated and analyzed in detail without a preliminary screening of these business processes to arrive at a shortlist of business processes having potential of being outsourced. Therefore, the approach of evaluating each business process is too tedious and time consuming. Also, the strategic techniques are qualitative in approach and therefore lack the objectivity required in the outsourcing decision making. In addition, the strategic techniques lack an organizational dimension and focus mainly on the business and technical dimensions. Therefore, missing out on an overall impact of an outsourcing decision on the enterprise.

There is therefore a need for an objective, robust and practical method and system for determining outsourcing suitability of a business process in an enterprise.

SUMMARY OF THE INVENTION

An aspect of the present invention is to provide a method and system for determining outsourcing suitability of a business process in an enterprise.

In order to fulfill the above aspects, the method comprises screening one or more business process in the enterprise to obtain a first set of business process that can potentially be outsourced. The method further comprises evaluating a business process corresponding to the first set of business process to evaluate suitability of the business process for outsourcing. Also, the method comprises preparing a migration plan for outsourcing the business process.

BRIEF DESCRIPTION OF THE DRAWINGS

The foregoing objects and advantages of the present invention for a method and system for determining outsourcing suitability of a business process in an enterprise may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
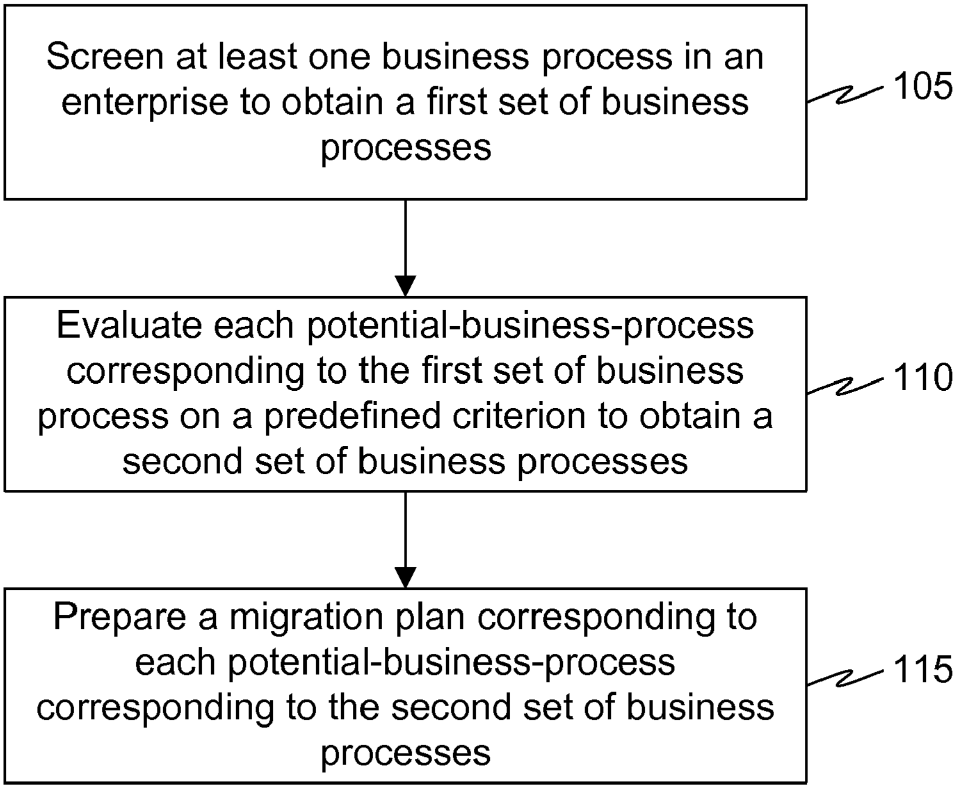
FIG. 1 is flowchart of a method for determining outsourcing suitability of at least one business process in an enterprise, in accordance with an embodiment of the present invention.

Before describing in detail embodiments that are in accordance with the present invention, it should be observed that the embodiments reside primarily in combinations of method steps and system components related to a system and method for determining outsourcing suitability of one or more business processes in an enterprise. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various embodiments of the invention provide method and system for determining outsourcing suitability of one more business processes in an enterprise. One or more business processes in the enterprise are screened to obtain a first set of business process that can potentially be outsourced. The first sets of business process are then evaluated based on a predefined criterion to obtain a second set of business processes that can be outsourced. Further, a migration plan is prepared of the second set of business processes for outsourcing the second set of business processes.

FIG. 1 is flowchart of a method for determining outsourcing suitability of at least one business process in an enterprise, in accordance with an embodiment of the present invention. The present invention provides a Process Cost Reduction Analysis (PCRA) method for enabling the enterprise to systematically and objectively make a decision to outsource a suitable business process. The PCRA method analyzes current business processes to identify business processes that are suitable for cost reduction through an outsourced offshore process management. The business processes are analyzed using a proprietary scoring model that uses various factors to assess the business processes for outsourcing suitability. This analysis, along an understanding of the financial benefits facilitates in deciding which business processes should be outsourced. A migration plan corresponding to the identified business processes is then created At step 105, one or more business processes in the enterprise are screened to obtain a first set of business process. The first set of business process includes business processes that can potentially be outsourced. The one or more business processes in the enterprise are quantified on the basis of the extent to which a business process, or parts of the business process can be outsourced. The screening step, 105, comprises developing a work-content-matrix. The work-content-matrix facilitates a qualitative assessment of nature of work and activities involved in each business process that can potentially be outsourced. This is further explained in detail in conjunction with FIG. 2.

Of all business processes in the enterprise the first set of business processes are obtained after performing the step of screening, 105, on the one or more business processes in the enterprise. The first set of business processes comprises a set of potential-business-process. A potential-business-process is a business process that can potentially be outsourced. It would be apparent to a person skilled in art that a scenario is possible when no business process is short listed at the end of the screening step. In this scenario, the first set of business process would be an empty set, containing no potential-business-process. At step 110, each potential-business-process corresponding to the first set of business processes obtained at the end of the screening step is evaluated on a predefined criterion to obtain a second set of business processes. The evaluation step facilitates objective consideration of all the possible parameters that might determine if outsourcing of a potential-business-process. Each potential-business-process is assessed on the predefined criterion to obtain a score corresponding to that potential-business-process. The potential-business-processes are further short listed based on their corresponding scores. The process of evaluating is further explained in detail in conjunction with FIG. 3.

At step 115, a migration plan is prepared corresponding to each potential-business-process corresponding to the second set of business processes that are short listed at the end of the evaluating step. It would be apparent to a person skilled in the art that a scenario is possible when no potential-business-process is short listed at the end of the evaluating step. The migration plan corresponding to each potential-business-process is a high-level project plan showing the individual steps involved and timelines thereof for off shoring each potential-business-process. The migration plan is used to prepare a detailed project plan later when the actual transition of a potential-business-process is initiated. Further, the migration plan corresponding to each potential-business-process can also be used as a progress and performance tracker for the project plan.

Figure 2:
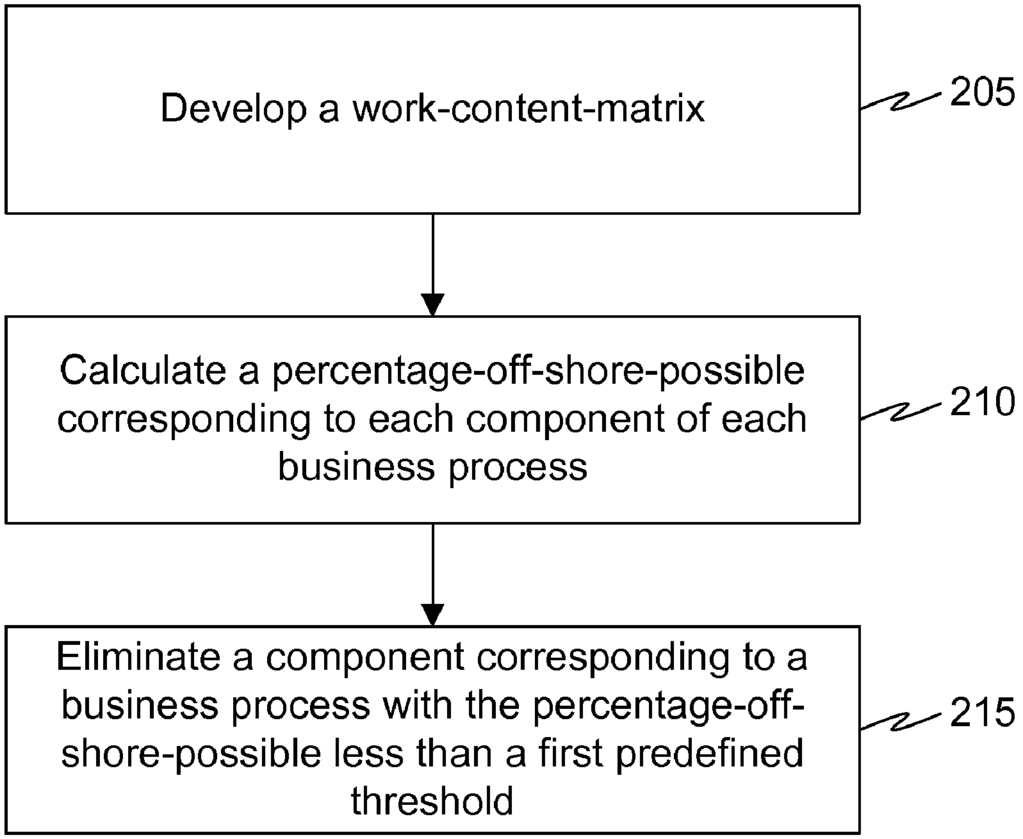
FIG. 2 is a flowchart of a method for screening at least one business process in the enterprise to obtain a first set of business process, in accordance with an embodiment of the present invention.

FIG. 2 is a flowchart of a method for screening at least one business process in the enterprise to obtain a first set of business process, in accordance with an embodiment of the present invention. One or more business processes in the enterprise are quantitatively and qualitatively analyzed to asses their outsourcing suitability. At step 205, a work-content-matrix is developed. The work-content-matrix facilitates a qualitative assessment of nature of work and activities involved in each business process that can potentially be outsourced. The step 205 further comprises categorizing each component corresponding to a business process based on work content corresponding to each component and physical-nature of work corresponding to each component. A component corresponding to a business process can be a sub-activity in a business process. The effort required for a component corresponding to each business process can be characterized as one or more of repetitive tasks, exception handling and quality audit task based on the physical-nature of work involved in executing that component.

Repetitive tasks consist of a bulk of any business process or sub-activity and are part of standard operating procedures. Generally, repetitive tasks have standard and document work flow and robust measurement systems build around them. Whereas, exception handling are one-off cases which require handling distinct or repetitive tasks. Exception handling task are not predictable and therefore can not be standardized. However, once a repository of the exceptions handled during the life of the business process is created, then these can be documented and standardized. The exception handling tasks require expert handling, in-depth knowledge and interaction at various levels.

The quality audit tasks on the other hand are verification, monitoring and reporting tasks. The quality audit tasks are low frequency tasks by their nature, predictable and standardized. Generally, the effort required for a business process characterized as repetitive task or a quality audit task tend be standardized and documented. As a result, the business process can be outsourced and can be executed by a service provider with minimal interaction. On the other hand, a business process classified as an exception handling task requires a much high level training and therefore are not considered as best suitable for outsourcing.

Further at step 205, each component is categorized based on the physical-nature of work corresponding to each component. The physical-nature of work can be for example, a customer-vendor-face-to-face-interaction, phone-only-computer-interaction, computer-only-paper-work, physically-location-dependent, outsourced and shared-function.

A component corresponding to a business process categorized as a customer-vendor-face-to-face-interaction requires customers to be physically present and interacting with the service provider. The work involved in the component can be for example, filling in and signing a service request form. Further, a component corresponding to a business process categorized as a phone-only-computer-interaction requires a live communication medium between the customer and the service provider. The live communication medium can be either a phone call or a web based chat. The work involved in the component can be for example, a customer support and a technical support. Additionally, a component corresponding to a business process categorized as a computer-only-paper-work does not require any direct interaction with the customers. The work involved in the component can be for example, analytics, reporting, accounting and responding to customers' communications. Further, a component corresponding to a business process categorized as a physically-location-dependent requires the service provider to be geographically co-located with the customers. The work involved in the component can be for example, fulfillment, shipping and filing.

Additionally, a component corresponding to a business process categorized as outsourced is the component that has already been outsourced to a service provider and therefore should not be assessed further for its potential to be outsourced. Further, a component to a business process categorized as a shared-function is component that is shared across the enterprise. The component can be for example, payroll and IT.

Components corresponding to a business process that are categorized as customer-vendor-face-to-face-interaction or physically-location-dependent can not be offshored at all as they require customers to be present and interacting with the service provider.

Once the components corresponding to each business process is categorized in the above mentioned categories, number of full time employees (FTEs) for each of the repetitive task, exception handling, quality audit corresponding to each component in each business process is determined. At step 210, a percentage-off-shore-possible for each component corresponding to each business process is calculated. A percentage-off-shore-possible is indicative of the amount of work that can be outsourced out of any component corresponding to each business process.

In an embodiment of the present invention, the percentage-off-shore-possible for a component in a business process is calculated as $$\text{Percentage-off-shore-possible} = \left(\frac{\text{Repetitive tasks } FTEs + \text{Quality Audit } FTEs}{\text{Total } FTEs}\right)$$

Where,

Total FTEs is the number of total FTEs corresponding to the component.

At step 215, a component corresponding to business process with the percentage-off-shore-possible less than a first predefined threshold is eliminated. A component with a percentage-off-shore-possible less than the predefined threshold is not suitable for outsourcing. However, it would be apparent to a person skilled in the art that the first predefined threshold can vary depending upon the nature of the business and in particular on the nature of the specific business process being considered. For example, there could be a component corresponding to a business process which employs a sizeable number of FTEs and is therefore suitable for outsourcing even though the percentage-off-shore-possible is less.

In addition to eliminating all the components corresponding to each business process having percentage-off-shore-possible less then the first predefined threshold, all the components that are being categorized as customer-vendor-face-to-face-interaction or physically-location-dependent are also eliminated as they require customers to be present and interacting with the service provider and therefore, are not suitable for outsourcing.

Once the work-content-matrix has identified the components corresponding to a business process that have potential to be outsourced and a first set of business process that can potentially be outsourced, the next step is to decide whether the identified components and the first set of business processes are actually suitable for outsourcing. The first set of business process comprises one or more potential-business-process. It would be apparent to a person skilled in art that a scenario is possible when no business process is short listed at the end of the screening step. In this scenario, the first set of business process would be an empty set, containing no potential-business-process.

Figure 3:
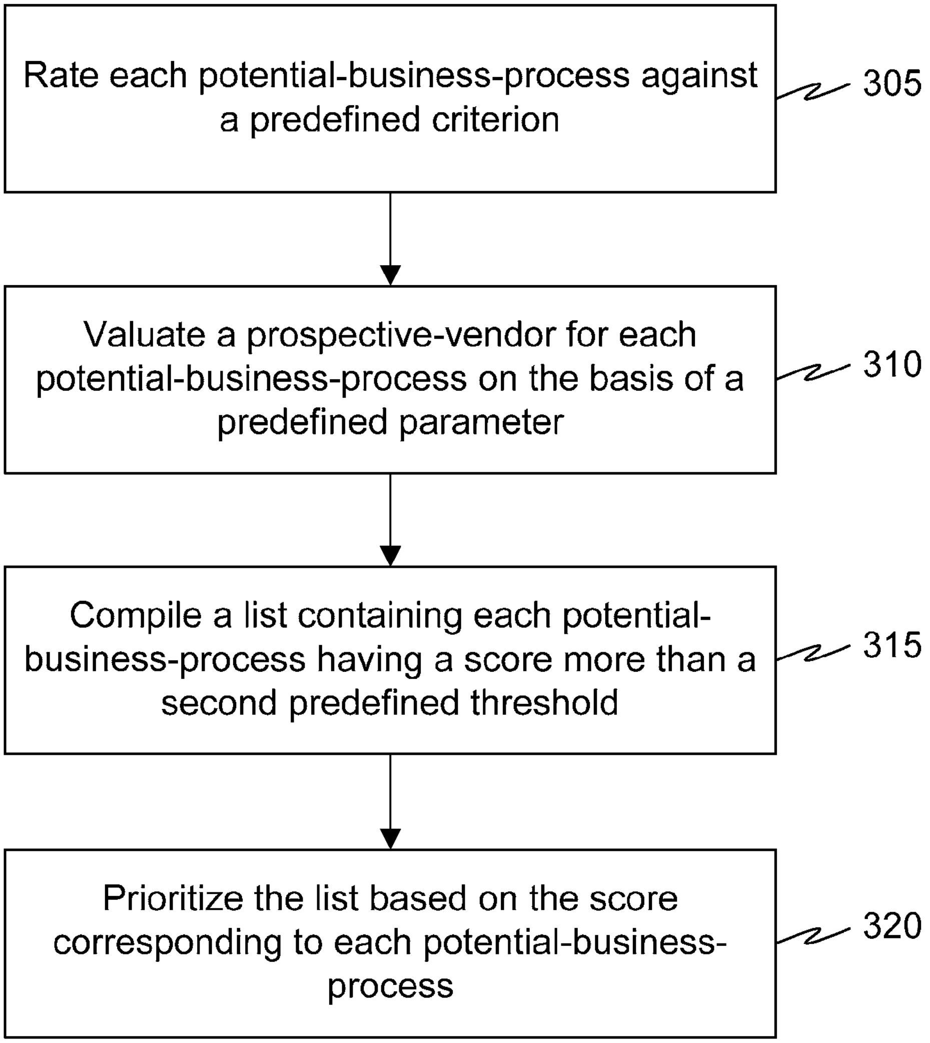
FIG. 3 is a flowchart of method for evaluating a potential-business-process on a predefined criterion, in accordance with an embodiment of the present invention.

In an embodiment of the present invention, when one or more potential-business-process are identified as an output of the screening step, each potential-business-process is evaluated on a process scorecard to determine the actual feasibility of outsourcing each potential-business-process to an offshore location. The evaluation step facilitates objectively consideration of all the possible parameters that might determine if outsourcing of a potential-business-process is feasible. Turning now to FIG. 3, a flowchart of method for evaluating a business process on a predefined criterion is shown in accordance with an exemplary embodiment of the present invention. At step 305, each potential-business-process is rated against a predefined criterion. In an embodiment of the present invention, the predefined criterion comprises parameters such as, manually intensive, level of standardization, process maturity, process linkages, expected savings, direct contact with end customer, legal aspects, potential quality improvements, language requirements, risk for end customer, IT-communication, complexity, skill availability, openness to change and workforce impact.

Each potential-business-process is rated against each of the above mentioned predefined criterion parameters. In an embodiment of the present invention each component is rated on a scale of 0 to 5 with respect to the above mentioned predefined criterion parameters.

A potential-business-process is rated on the manually intensive parameter on the basis of the extent to which manual effort is required in the potential-business-process. For example, data entry (rating 5) is an extremely manual process whereas customer service through an IVR (interactive voice response system) is a completely automated process (rating 0). Further, a potential-business-process is rated on the level of standardization parameter on the basis of the extent to which the process is standardized. For example, insurance claims processing (rating 5) is a highly standardized process with standard steps and rules whereas insurance pricing has little or no standardization (rating 0).

Additionally, a potential-business-process is rated on process maturity parameter on the basis of how close a process is to being developed and complete, and capable of continuous improvement through quantitative measure and feedback. For example, phone-based customer service processes like welcome calls are typically well-defined (rating 5) whereas underwriting of large insurance deals is a process with low process maturity (rating 0). Further, a potential-business-process is rated on process linkages parameter based on the extent to which the process works on its own with minimal or no linkage with other processes and departments. For example, telemarketing processes have minimal linkage with other potential-business-processes (rating 5) while on-site IT support has extensive linkages (rating 0)

Additionally, a potential-business-process is rated on expected savings parameter based on the net benefit resulting from outsourcing the process. For example cost savings of 50% or more (rating 5) as compared to negative or zero cost savings (rating 0). A cost benefit analysis (CBA) is a critical input to the process scorecard as it determines the financial viability of an outsourcing decision. In the CBA cost involved in the outsourcing a potential-business-process is calculated and then the benefits which can be derived from it our calculated. This comprises of two parts, one an assessment of an initial investment to me made for outsourcing, and two, an estimate for a potential annual savings which can be accrued in a predefined payback period. It is desired that the financial benefit be positive, else a potential-business-process is not suitable for outsourcing.

Further, a potential-business-process is rated on the parameter of direct contact with end customer based on the extent to which the potential business-process requires direct contact between the end customer and the service delivery staff. For example, most back-office processes require no interaction with the customer (rating 5) whereas face-to-face loan application taking requires direct contact with the end customer (rating 0)

Additionally, a potential-business-process is rated on legal aspects parameter on the basis of whether there exists legal compliance or regulations against moving the potential-business-process. For example, customer service and technology support have fewer restrictions against outsourcing (rating 5) whereas many US states do not allow the outsourcing of government processes (rating 0). Further, a potential-business-process is rated on potential quality improvements parameter based on whether the potential-business-process has potential for improvements in service levels and productivity when outsourced. For example a current potential-business-process is not in control or underperforming and there is a lot of potential for quality improvement (rating 5) as compared to those potential-business-processes where outsourcing might lead to a decline in quality (rating 0)

Further, a potential-business-process is rated on language requirements parameter on the basis of the number of languages required for running the potential-business-process and the fluency required thereof. For example, low level fluency or single language requirement as required in data entry processes (rating 5) as compared to high fluency or multiple languages required for a multiple language customer service or tech support process (rating 0). Additionally, a potential-business-process is rated on risk for external end customer parameter on the basis of the impact on the external end customer in case the potential-business-process fails. For example, call quality monitoring on completed calls has minimum impact on the end customer (rating 5) whereas certain kinds of transaction processing involving confidential financial information have a high risk (rating 0)

Further, a potential-business-process is rated on IT-Communication parameter on the basis of the extent of technology changes required before the potential-business-process can be moved. For example, certain data analysis processes only require transfer of files through e-mail (rating 5) whereas most inbound or outbound calling processes require high end technology changes (rating 0). Additionally, a potential-business-process is rated on complexity parameter on the basis of the complexity of the process as measured by the extent of knowledge capture or training required. For example, most data entry processes are quite simple in nature (rating 5) whereas risk analysis is a complex process (rating 0)

Also, a potential-business-process is rated on skill availability on the basis of how easy is it to get workforce with the required skills For example, resources for data entry processes are easily available (rating 5) while it is difficult to get certified underwriters for insurance processes (rating 0). Further, a potential-business-process is rated on Openness to change parameter on the basis of the extent of support for the potential-business-process to be relocated. This is a subjective rating based on an assessment of the support towards change in client organization.

Additionally, a potential-business-process is rated on workforce impact parameter based on the extent to which the client's current workforce is impacted by the movement of the potential-business-process. For example, layoffs and redeployment options. This is a subjective rating based on an assessment of the impact on the client workforce due to the movement of the potential-business-process.

In an exemplary embodiment of the present invention, if a potential-business-process scores less than 30 on the process scorecard, then the potential-business-process is unsuitable for process relocation. If a potential-business-process scores more then 50, then the potential-business-process is suitable for process relocation. Further, if a potential-business-process scores 0 in any of the parameters of the predefined criterion, then the potential-business-process needs to be evaluated carefully. Also, if a potential-business-process scores below 3 on any of the parameters of the predefined criterion requires a risk migration or action plan.

Once, each potential-business-process is evaluated on the process scorecard, at step 310, a prospective-vendor is evaluated for each potential-business-process on the basis of a predefined parameter. In an embodiment of the present invention, the predefined parameter can be expertise of the prospective-vendor in executing a business process similar to a potential-business-process. In an exemplary embodiment of the present invention, a prospective-vendor is rated on a 3-point scale of 25, 15 and 0. Wherein the rating of 25 indicates expertise of the prospective-vendor in executing a same business process as a potential-business-process, the rating of 15 indicates expertise of the prospective-vendor in executing a similar business process as a potential-business-process and the rating of 0 indicates no expertise of the prospective-vendor in executing a same or similar business process as a potential-business-process.

A score corresponding to each potential-business-process is obtained by adding the score on the process scorecard corresponding to each potential-business-process and the rating of the prospective-vendor corresponding to each potential-business-process. At step 315, a list containing each potential-business-process having a score more than a second predefined threshold is compiled. In an embodiment of the present invention, the second predefined threshold depends on the business goals of the enterprise and business-process-specific decision on prospective-vendor, subject to the minimum score on the process scorecard. For example, if the total score for the potential-business-process is low owing to a low rating on the prospective-vendor, the potential-business-process could still be considered if it is known that most other prospective-vendors would score low on prospective-vendor rating. At step 320, the list is prioritized based on the score corresponding to each potential-business-process. The prioritized list provides a sequence of the potential-business-processes that are suitable for outsourcing. A migration plan for each of the potential-business-process is than prepared in an order of the sequence of the potential-business-processes.

Figure 4:
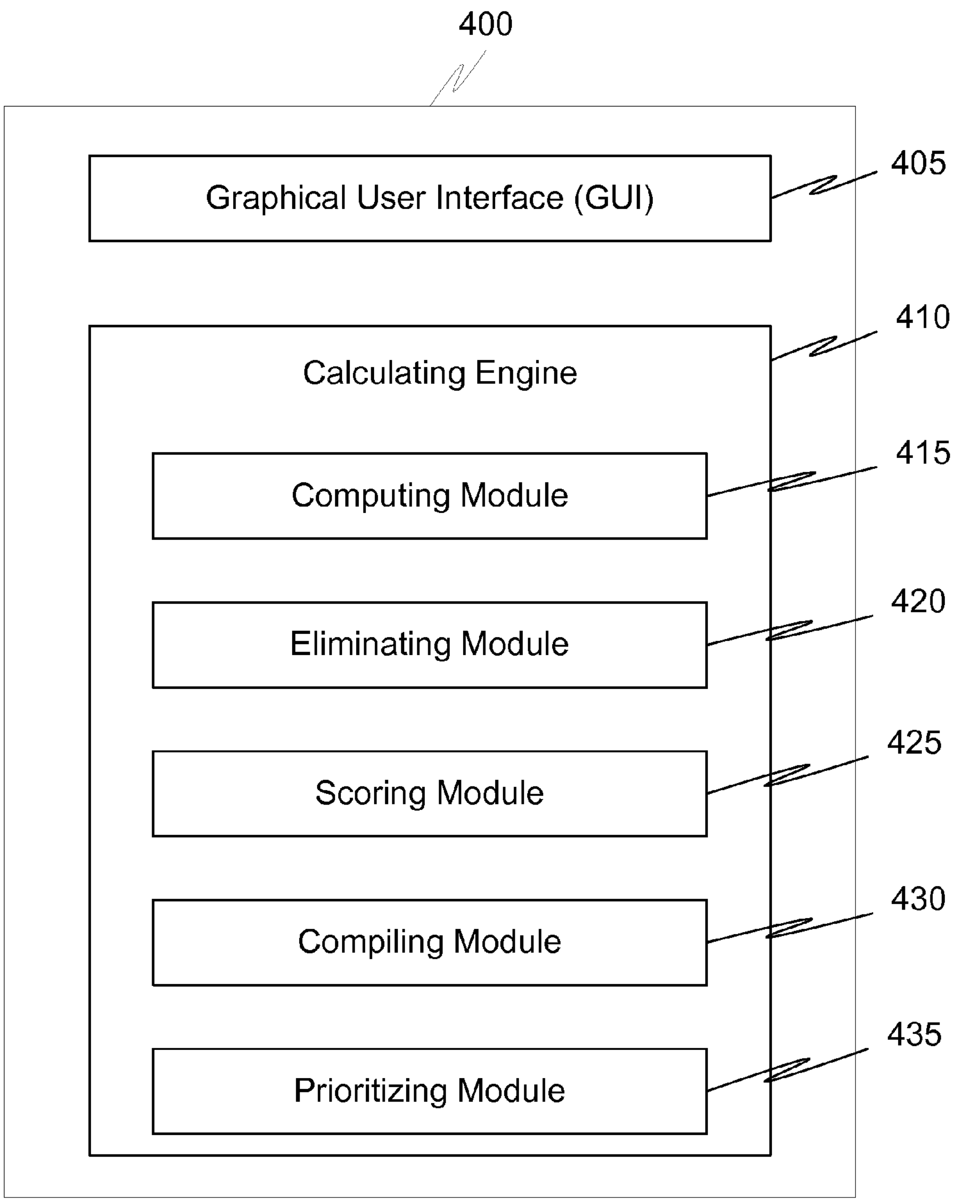
FIG. 4 shows a block diagram of a system for determining outsourcing suitability of at least one business process in an enterprise, in accordance an embodiment of the present invention.

Turning now to FIG. 4, a block diagram of a system 400 for determining outsourcing suitability of at least one business process is shown in an enterprise in accordance an embodiment of the present invention. System 400 comprises a Graphical User Interface (GUI) 405 and a calculating engine 410. In an embodiment of the invention, GUI 405 facilitates a user to screen one or more business process in the enterprise to obtain a first set of business processes. The first set of business processes can potentially be outsourced. The first set of business processes comprises a set of potential-business-process. A potential-business-process is a business process that can potentially be outsourced. It would be apparent to a person skilled in art that a scenario is possible when no business process is short listed at the end of the screening step. In this scenario, the first set of business process would be an empty set, containing no potential-business-process.

Further, GUI 405 is also facilitates a user to evaluate each potential-business-process corresponding to the first set of business process on a predefined criterion. Each potential-business process obtained at the end of the screening step is evaluated to obtain a second set of business processes that are suitable for outsourcing. Each activity involved in a potential-business-process is evaluated based on the predefined criterion to obtain their suitability for outsourcing. The evaluation step facilitates objectively consideration of all the possible parameters that might determine if outsourcing of a certain activity in a potential-business-process is feasible. Each potential-business-process is weighed on the predefined criterion to obtain a score corresponding to each potential-business-process. The potential-business-processes are further short listed based on their corresponding scores. Also, GUI 405 facilitates a user to prepare a migration plan corresponding to the one or more potential-business-process.

Calculating engine 410 comprises a computing module 415, an eliminating module 420, a scoring module 425, a compiling module 430 and a prioritizing module 435.

Computing module 415 computes a percentage-off-shore-possible corresponding to each component corresponding to each business process. A component corresponds to a sub-activity in a business process. A percentage-off-shore-possible is an indicative of an amount of work that can be outsourced out of any component corresponding to each business process.

Further, eliminating module 420 eliminates a component corresponding to business process with the percentage-off-shore-possible less than a first predefined threshold. As a component with a less percentage-off-shore-possible is not suitable for outsourcing.

Scoring module 425 calculates a score for each potential-business-process. A score corresponding to each potential-business-process is obtained by adding a process scorecard corresponding to each potential-business-process and a rating of the prospective-vendor corresponding to each potential-business-process. Compiling module 430 compiles a list containing each potential-business-process having score more than a second predefined threshold. And, prioritize module 435 prioritizes the list based on the score corresponding to each potential-business-process. The prioritized list provides a sequence of the potential-business-processes that are suitable for outsourcing. A migration plan for each of the potential-business-process is than prepared in an order of the sequence of the potential-business-processes.

Further, various embodiments of the invention provide method and system for determining outsourcing suitability of one or more business process in an enterprise. The suitability of the business process for outsourcing is evaluated on the basis of the cost reduction along with a detailed understanding of the business process and the service provider's competence vis-à-vis business process requirements. Also, each business process is evaluated and analyzed with a preliminary round of screening to quickly arrive at a set of business processes having potential of being outsourced. In addition various factors are taken into consideration while evaluating a business process. Therefore, an overall impact of an outsourcing decision on the enterprise can be realized.

The method for determining outsourcing suitability of one or more business process in an enterprise, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for determining outsourcing suitability of at least one business process in an enterprise, the method being performed in a computing device, the method comprising:

screening, in said computing device, the at least one business process in the enterprise to obtain a first set of business processes, wherein the first set of business processes can potentially be outsourced, wherein said screening comprises:

categorizing each component corresponding to each business process according to a work-content matrix, wherein said work-content matrix is characterized by physical-nature of work involved in execution of the component in one dimension and work-content in a second dimension, wherein a component corresponds to a sub-activity in a business process, wherein the work-content dimension comprises a repetitive task, an exception handling task and a quality audit task, wherein said physical nature dimension comprises a customer-vendor-face-to-face-interaction, phone-only-computer-interaction, computer-only-paper-work, physically-location-dependent, outsourced and shared-function, wherein said work-content dimension and said physical nature dimension together define a table of entries of said work-content matrix, wherein said categorizing identifies each component with one of the entries of said table;

including a business process of said at least one business process in said first set of business processes only if none of the components of the business process is categorized in said work-content matrix as requiring customer-vendor-face-to-face-interaction or is physically-location-dependent;

determining number of full time employees (FTEs) for the work-content corresponding to each component; and calculating a percentage-off-shore-possible corresponding to each component corresponding to each business process as a function of number of FTEs for a repetitive task corresponding to the component, number of FTEs for a quality audit task corresponding to the component and total number of FTEs for the component, wherein said including includes the business process in said first set of business processes only if none of the components of the business process has a percentage-off-shore-possible less than a first predefined threshold;

evaluating, in said computing device, each potential-business-process corresponding to the first set of business process on a predefined criterion to obtain a second set of business processes, wherein the second set of business processes can be outsourced, wherein the evaluating step comprises:

rating each potential-business-process against the predefined criterion;

valuating a prospective-vendor for each potential-business-process on the basis of a predefined parameter;

compiling a list containing each potential-business-process having score more than a second predefined threshold, wherein the score is a sum of the rating of a potential-business-process against the predefined-criterion and the valuation of a prospective-vendor for the potential-business-process; and prioritizing the list based on a score corresponding to each potential-business-process; and preparing, in said computing device, a migration plan corresponding to each potential-business-process corresponding to the second set of business processes in response to evaluating.

2. The method of claim 1, wherein the predefined criterion comprises manually intensive, level of standardization, process maturity, process linkages, expected savings, direct contact with end customer, legal aspects, potential quality improvements, language requirements, risk for end customer, IT-communication, complexity, skill availability, openness to change and workforce impact.

3. The method of claim 1, wherein the predefined parameter is expertise of the vendor in executing a business-process similar to a potential-business-process.

4. A non-transitory computer usable medium storing one or more instructions, which when executed by a system causes said system to determine outsourcing suitability of at least one business process in an enterprise, the one or more instructions comprising:

a first set of instructions, which when executed in said system provides a graphical user interface (GUI), the GUI facilitating a user to:

screen at least one business process in the enterprise to obtain a first set of business processes, wherein the first set of business processes can potentially be outsourced, wherein said screen comprises:

categorize each component corresponding to each business process according to a work-content matrix, wherein said work-content matrix is characterized by physical-nature of work involved in execution of the component in one dimension and work-content in a second dimension, wherein a component corresponds to a sub-activity in a business process, wherein the work-content dimension comprises a repetitive task, an exception handling task and a quality audit task, wherein said physical nature dimension comprises a customer-vendor-face-to-face-interaction, phone-only-computer-interaction, computer-only-paper-work, physically-location-dependent, outsourced and shared-function, wherein said work-content dimension and said physical nature dimension together define a table of entries of said work-content matrix, wherein said categorize identifies each component with one of the entries of said table;

include a business process of said at least one business process in said first set of business processes only if none of the components of the business process is categorized in said work-content matrix as requiring customer-vendor-face-to-face-interaction or is physically-location-dependent;

determine number of full time employees (FTEs) for the work-content corresponding to each component; and calculate a percentage-off-shore-possible corresponding to each component corresponding to each business process as a function of number of FTEs for a repetitive task corresponding to the component, number of FTEs for a quality audit task corresponding to the component and total number of FTEs for the component, wherein said include operates to include the business process in said first set of business processes only if none of the components of the business process has a percentage-off-shore-possible less than a first predefined threshold; and evaluate each potential-business-process corresponding to the first set of business process on a predefined criterion to obtain a second set of business processes, wherein the second set of business processes can be outsourced, wherein said evaluate further comprises:

rating each potential-business-process against the predefined criterion;

valuating a prospective-vendor for each potential-business-process on the basis of a predefined parameter;

compiling a list containing each potential-business-process having score more than a second predefined threshold, wherein the score is a sum of the rating of a potential-business-process against the predefined-criterion and the valuation of a prospective-vendor for the potential-business-process; and prioritizing the list based on a score corresponding to each potential-business-process; and prepare a migration plan corresponding to each potential-business-process corresponding to the second set of business processes; and a second set of instructions, which when executed in said system provides a calculating engine, the calculating engine comprising:

a computing module, the computing module computing a percentage-off-shore-possible corresponding to each component corresponding to each business process, wherein a component corresponds to a sub-activity in a business process; and a scoring module, the scoring module calculating a score for each potential-business-process, wherein the score is a sum of the rating of a potential-business-process against a predefined-criterion and the valuation of a prospective-vendor for the potential-business-process.

5. The medium of claim 4, wherein the calculating engine further comprises:

an eliminating module, the eliminating module eliminating a component corresponding to a business process with a percentage-off-shore-possible less than a first predefined threshold;

a compiling module, the compiling module compiling a list containing potential-business-process having score more than a second predefined threshold; and a prioritizing module, the prioritizing module prioritizing the list based on a score corresponding to each potential-business-process.

6. A computer program product comprising a non-transitory computer usable medium having a computer readable program method for determining outsourcing suitability of at least one business process in an enterprise, wherein the computer readable program when executed on a computer causes the computer to:

screen at least one business process in the enterprise to obtain a first set of business processes, wherein the first set of business processes can potentially be outsourced, wherein said screen comprises:

categorize each component corresponding to each business process according to a work-content matrix, wherein said work-content matrix is characterized by physical-nature of work involved in execution of the component in one dimension and work-content in a second dimension, wherein a component corresponds to a sub-activity in a business process, wherein the work-content dimension comprises a repetitive task, an exception handling task and a quality audit task, wherein said physical nature dimension comprises a customer-vendor-face-to-face-interaction, phone-only-computer-interaction, computer-only-paper-work, physically-location-dependent, outsourced and shared-function, wherein said work-content dimension and said physical nature dimension together define a table of entries of said work-content matrix, wherein said categorize identifies each component with one of the entries of said table; and include a business process of said at least one business process in said first set of business processes only if none of the components of the business process is categorized in said work-content matrix as requiring customer-vendor-face-to-face-interaction or is physically-location-dependent;

determine number of full time employees (FTEs) for the work-content corresponding to each component; and calculate a percentage-off-shore-possible corresponding to each component corresponding to each business process as a function of number of FTEs for a repetitive task corresponding to the component, number of FTEs for a quality audit task corresponding to the component and total number of FTEs for the component, wherein said including includes the business process in said first set of business processes only if none of the components of the business process has a percentage-off-shore-possible less than a first predefined threshold; and evaluate each potential-business-process corresponding to the first set of business process on a predefined criterion to obtain a second set of business processes, wherein the second set of business processes can be outsourced, wherein said evaluate further comprises:

rate each potential-business-process against the predefined criterion;

valuate a prospective-vendor for each potential-business-process on the basis of a predefined parameter;

compile a list containing each potential-business-process having score more than a second predefined threshold, wherein the score is a sum of the rating of a potential-business-process against the predefined-criterion and the valuation of a prospective-vendor for the potential-business-process;

prioritizing the list based on a score corresponding to each potential-business-process; and prepare a migration plan corresponding each potential-business-process corresponding to the second set of business processes.

7. The computer program product of claim 6, wherein the predefined criterion comprises manually intensive, level of standardization, process maturity, process linkages, expected savings, direct contact with end customer, legal aspects, potential quality improvements, language requirements, risk for end customer, IT-communication, complexity, skill availability, openness to change and workforce impact.

8. The computer program product of claim 7, wherein the predefined parameter is expertise of the vendor in executing a business-process similar to a potential-business-process.

9. The method of claim 1, wherein said calculating of said percentage-off-shore-possible (P) is according to the computation:

$$P=(R+Q)/T$$

wherein R represents number of FTEs for a repetitive task corresponding to the component, Q represents number of FTEs for a quality audit task corresponding to the component, and T represents the total number of FTEs for the component.

10. The computer program product of claim 6, wherein said calculation of said percentage-off-shore-possible (P) is according to the computation:

$$P=(R+Q)/T$$

wherein R represents number of FTEs for a repetitive task corresponding to the component, Q represents number of FTEs for a quality audit task corresponding to the component, and T represents the total number of FTEs for the component.

* * * * *